United States Patent
Totty et al.

(10) Patent No.: US 7,509,397 B1
(45) Date of Patent: Mar. 24, 2009

(54) WEB PORTHOLES: USING WEB PROXIES TO CAPTURE AND ENHANCE DISPLAY REAL ESTATE

(75) Inventors: Brian Totty, San Francisco, CA (US);
Sailendra Padala, Sunnyvale, CA (US);
Vikas Jha, San Leandro, CA (US);
Brian Roberts, Hillsborough, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/544,356

(22) Filed: Apr. 6, 2000

(51) Int. Cl.
*G06F 15/16* (2006.01)
*G06F 17/00* (2006.01)

(52) U.S. Cl. .................. 709/219; 709/217; 715/234; 715/243; 715/244

(58) Field of Classification Search .............. 709/203, 709/217, 219; 715/513, 517, 523
See application file for complete search history.

(56) References Cited

U.S. PATENT DOCUMENTS

| | | | | |
|---|---|---|---|---|
| 5,611,049 | A | | 3/1997 | Pitts ...................... 395/200.09 |
| 5,854,897 | A | * | 12/1998 | Radziewicz et al. ......... 709/224 |
| 5,991,810 | A | * | 11/1999 | Shapiro et al. .............. 709/229 |
| 6,085,234 | A | | 7/2000 | Pitts et al. .................... 709/217 |
| 6,128,651 | A | * | 10/2000 | Cezar ......................... 709/217 |
| 6,128,655 | A | * | 10/2000 | Fields et al. ................ 709/219 |
| 6,249,844 | B1 | * | 6/2001 | Schloss et al. ............... 711/122 |
| 6,317,761 | B1 | * | 11/2001 | Landsman et al. ........... 715/513 |
| 6,338,059 | B1 | * | 1/2002 | Fields et al. .................... 707/4 |
| 6,466,975 | B1 | * | 10/2002 | Sterling ....................... 709/223 |
| 6,499,042 | B1 | * | 12/2002 | Markus ........................ 715/507 |
| 6,553,393 | B1 | * | 4/2003 | Eilbott et al. ................ 715/513 |
| 6,606,653 | B1 | * | 8/2003 | Ackermann et al. ......... 709/219 |
| 6,636,247 | B1 | * | 10/2003 | Hamzy et al. ............... 715/808 |
| 6,687,746 | B1 | * | 2/2004 | Shuster et al. .............. 709/223 |
| 6,704,873 | B1 | * | 3/2004 | Underwood ................. 726/12 |

* cited by examiner

*Primary Examiner*—Salad Abdullahi
*Assistant Examiner*—Avi Gold
(74) *Attorney, Agent, or Firm*—Hickman Palermo Truong & Becker LLP; Christian A. Nicholes

(57) ABSTRACT

Techniques are disclosed for allowing a specialized proxy server called a "porthole engine" to deliver unrequested content to users browsing the Internet. In one embodiment, a user requests a web page. In response, the user receives the requested web page accompanied by unrequested information that an organization wishes the user to see. The requested web page and the unrequested information are displayed on the user's display, either within the browser of the user, or as part of a separate window. In one embodiment, the requested web page and the unrequested information are displayed in frames. In an alternative embodiment, the unrequested information is implemented according the capabilities of the particular browser software, customized to the browsing consumer, targeted to explicit and inferred characteristics of the consumer, and branded to the organization providing access.

54 Claims, 4 Drawing Sheets

FIG. 1

FIG. 2 http://some-isp.net/porthole/frame1.html 208-1 http://www.cajun-gifts.com
204 http://some-isp.net/porthole/frame2.html
208-2

WEB PORTHOLES: USING WEB PROXIES TO CAPTURE AND ENHANCE DISPLAY REAL ESTATE

FIELD OF THE INVENTION

The present invention relates to the Internet and, more specifically, to providing unrequested information to users using the Internet.

BACKGROUND OF THE INVENTION

Client-server computer systems have been commonly used for various purposes. Typically, client computers or processes (or "clients") are separated from the servers and are connected to these servers over a network. The clients request information from one of the servers by providing a network address of the information. The server locates the information based on the provided network address and transmits the information over the network to the client, completing the transaction.

The Internet

Figure 1:
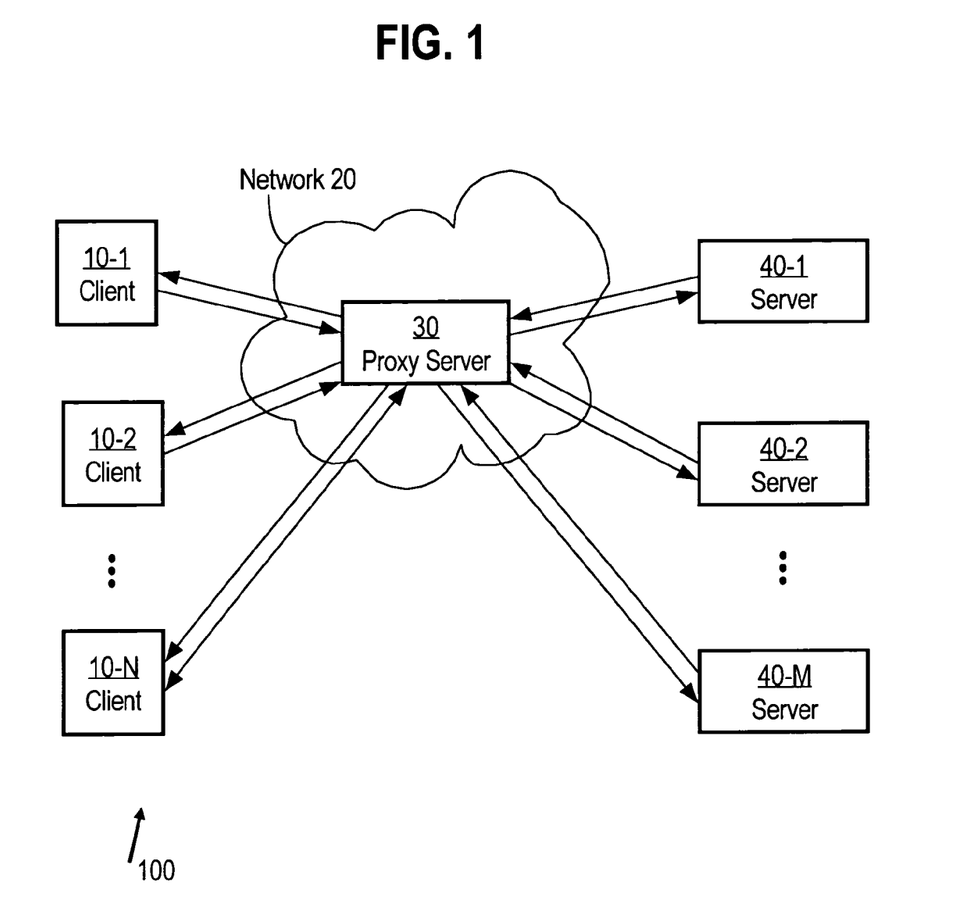
FIG. 1 is a simplified block diagram of the relationship between elements in a web system.

The World Wide Web, or the web, is a popular application of the client/server computing model. FIG. 1 is a simplified block diagram of the relationship between elements in a web system 100. One or more web clients 10 are connected to a global information network 20. Each client 10 is a computer or a software process such as a browser program.

Network 20, is the global data comprised of interconnected network devices residing in private intranets and public internets. For the purposes of this document, public internets and private intranets are treated as analogous, and the Network 20 is referred to by the commonly held name "Internet."

Portions of the Internet 20 may be owned and operated by different organizations, including, for example, private corporations, Internet Service Providers (ISPs), and backbone network carriers. These organization cooperate to provide global data connectivity.

A web server 40 is likewise connected to the Internet 20. A web server 40 has one or more internet network addresses and textual host names that are associated in an agreed-upon format. Web servers 40 contain multimedia information resources, such as documents and images, to be provided to clients 10 on request. Web servers 40 may additionally or alternatively contain software for dynamically generating such resources.

Clients 10 and servers 40 communicate using one or more agreed-upon protocols that specify the format of the information that is communicated. A client 10 establishes a logical network connection to a particular server 40 using a communication protocol called the Hypertext Transfer Protocol (HTTP). A client 10 may use HTTP to communicate directly to web servers 40, or through one or more HTTP intermediary devices known as proxy or gateway servers.

A Uniform Resource Locator (URL) uniquely identifies each information object stored on or dynamically generated by servers 40. A URL is a form of network address that identifies the location of information stored on a host server in a network. Information documents provided by web servers 40 to clients 10 are encoding in a rich and continually growing set of multimedia formats. One of the more popular formats of these information documents is HTML. HTML documents are commonly referred to as web pages.

Proxy Servers

Web clients 10 communicate with web servers 40 to perform transactions and transport documents. While web clients 10 can communicate directly with web servers 40, it is becoming increasingly popular for web clients 10 to communicate with web servers 40 through one or more intermediary proxy servers. A proxy server performs a transaction on a client's behalf.

In one arrangement, as shown in FIG. 1, a proxy server 30 is logically interposed between clients 10 and server 40. Proxy server 30 provides a "middleman" gateway service between clients 10 and servers 40. Proxy server 30 receives the client's request, and forwards the request to the servers 40. Proxy server 30 then receives the corresponding response from servers 40 and passes it back to clients 10.

Some proxy servers 30 may be explicitly visible to clients 10 (requiring client configuration and participation to use the proxy server). Other proxy servers 30 may be transparent to the clients, intercepting the traffic as it flows by. In either case, a proxy server 30 provides the same middleman function, regardless of client awareness of the proxy server 30.

Some proxy servers 30 forward requests and responses untouched. Other proxy servers 30 may subtly or heavily transform the request and response content as part of its middleman function. As an example, proxy servers 30 may be used to filter offensive content before being shown to an underage audience. As another example, proxy servers 30 may transform web pages between natural languages, to provide a portable multi-lingual browsing experience.

Proxy Servers and Internet Service Providers

In one embodiment, proxy servers 30 are used by the Internet Service Provider (ISP), such as America On Line, Prodigy, MSN, Excite@Home, AT&T Worldnet, UUNET, etc. These ISPs provide services for users who use clients 10 to get access to servers 40. In this context, a server 40 may be referred to as an origin server 40.

Typically, a user, connecting to the Internet, uses client 10 and dials in to an ISP (or has a permanent connection to the ISP). The ISP, as a middle man, typically does not have the information the user wants. This information is stored in any of the origin servers 40. When the user makes a request for the information, the request goes to the ISP, which forwards the request to one of the origin servers 40. Origin servers 40 then provide the requested information in the form of web pages to the ISP, and the ISP forwards the web pages to the user.

In brief, everything the user requests or receives goes through the ISP or the ISP's proxy server 30. The proxy server 30 acts as a centralized intermediary, and is capable of observing all of the incoming and outgoing HTTP traffic flows.

Proxy Servers and Corporate Intranets

In one embodiment, proxy servers 30 are used inside corporate information networks, especially at a point of traffic aggregation, or gateways between geographic divisions or the greater Internet. Analogous to the Internet Service Provider model, a client 10 inside a corporate intranet may access a server 40 inside the intranet, or on the greater internet, through the services of an intermediary proxy server 30.

Caching Proxy Servers

Proxy servers 30, in addition to serving as the pipeline between clients 10 and the Internet, may also implement caching techniques, by storing replicas of popular information documents in a proximate local storage. Through the use of caching, proxy servers 30 can quickly provide replicas of information to clients 10 from the proximate local storage, reducing delays and internet traffic to the more distant origin servers.

Proxy servers 30 receive requests for resources that are directed from clients 10 to servers 40. When the cache in proxy servers 30 has a replica of the requested resource that meets certain freshness and applicability constraints, proxy servers 30 respond to the clients 10 and serve the resource directly. In this arrangement, the number and volume of data transfers between a proxy server 30 and origin servers 40 are greatly reduced. As a result, network resources or objects are provided more rapidly and at lower cost to clients 10.

The Web Pages

Users typically use a web browser application, such Netscape Communicator, Microsoft Explorer, etc., on a client 10 to navigate through the Internet 20, and to perform transactions with various origin servers 40 for desired information. Browsers are computer programs that are designed to request items from the network, and to decode and display the requested items when they are provided to clients 10.

The user interface of a browser includes, among other things, (1) a content display region, and (2) a control region. The control region of a browser may contain any number and type of controls that allow a user to access the functionality of the browser. The content display region of a browser is a region dedicated to the display of content retrieved by the browser.

Users typically receive information from the web in form of web pages that are displayed in the content display region of the browser. Web pages have a hierarchical architecture. Each web page may consist of various items, where each distinct item must be separately fetched. Items that are parts of a web page are referred to herein as "embedded" items. The embedded items of a single web page may even reside on different origin servers 40 on the Internet 20. An embedded item may be, for example, a digital image, a sound file, or a link to another web page. Embedded items may themselves be web pages. For example, a web page may specify (1) a set of frames and (2) web pages that are to populate those frames.

The browser interprets the HTML representing a web page, and in response to decoding tags to embedded items, sends requests to retrieve the embedded items to "complete" the generation of the web page. From the HTML data, the browser knows how to get each embedded document from the URL of the document. Since an embedded item may itself include embedded items, the browser recursively requests the embedded items until the document is fully rendered.

Affinity Merchandising, Branding, and Screen Real Estate

As users of the Internet 20 increase, numerous commercial parties seek to extract commercial value by marketing to users as they browse the Internet. These commercial parties seek to exploit two factors of Internet browsing: (1) the interests of users can be inferred by their Internet browsing behavior, and (2) these interests can be monetized by targeting merchandizing to the user (displaying advertisements, promotions, or other marketing vehicles in sections of the user's web browser). The web browser in effect acts as "billboard" space for paid marketing and merchandising placements.

Server Portals

Origin server-generated advertisements are commonly visible to today's Internet users. Typically, these advertisements are included as part of the web pages that the users request. As the users receive and watch the requested web pages, the users also see the advertisements in the web pages. Because the advertisements are embedded items within the web page, they are displayed as part of the web page within the content display region of the browser. In addition, because the advertisements are part of the web pages, they are controlled by the parties that control the web pages (the "content providers"). The content providers therefore obtain the revenue that the sale of such advertising generates.

In this scenario, the organization responsible for the origin server 40 desires clients to frequently visit their web server as opposed to competitive properties, for two reasons. First, the origin server organization receives compensation for delivering merchandising campaigns to the user. The more the user visits the origin server 40, the higher the revenue. Second, the origin server organization can charge higher rates for use of its display real estate if it can collect more demographic information about the user. If the user is more active on the origin server 40, the origin server 40 can collect more information about the user's overall interests.

In both cases, the origin server 40 is attempting to increase the user's "affinity" to the web site, because greater affinity implies greater revenue potential. Because users are not forced to visit any particular web site, web sites compete fiercely with brand and experience to capture "loyal" user communities.

Origin servers 40 that attempt to attract and retain users through the use of brand and services are conventionally called "portals." The goal of such servers is to become the single destination for Internet transactions, thus maximizing customer affinity.

Client Portals

In another arrangement, the user is provided a customized browser that displays advertisements, promotions, and branding decoration either within the browser, or in an alternative section of display screen real estate (often floating, always-on-top windows). However, users generally prefer to choose their own browsers, and therefore are only enticed to use such custom browser software through incentives such as free Internet access. Additionally, the inconvenience and cost of managing software distribution to end consumers makes customized browsers an undesirable solution in many situations.

In a third arrangement, a user browses to a specific origin server 40 which provides an application gateway for browsing other web sites. The origin server implements a kind of "browser in a server," providing server-side controls that let the users specify other sites that the users want to access. As the users use the controls of the control site to browse the desired web pages, advertisements are sent to the users from the controller of the control site. As with all server solutions, users can typically circumvent the control site by pointing their browser software to an alternative origin server, thus avoiding the advertisements sent.

Similar to origin server portals, browsers customized to support affinity merchandising act as a kind of "client-side" portal—obtaining a captive audience, and monetizing captured screen real-estate.

SUMMARY OF THE INVENTION

Techniques are disclosed for allowing a proxy server to deliver unrequested content to users browsing the Internet. In such a configuration, the proxy server is called a "porthole engine."

In one embodiment, a user requests a web page. In response, the user receives the requested web page accompanied by unrequested information that an organization wishes the user to see. The requested web page and the unrequested information are displayed on the user's display, either within the browser, or as part of a separate window. In one embodiment, the requested web page and the unrequested information are displayed in frames. For example, the porthole engine responds to requests for web pages by sending frame data to the user, where the frame data (1) defines frames, and (2) specifies embedded items that are to populate the frames, where one of the embedded items is the originally-requested web page.

In one embodiment, the unrequested information may be implemented according the capabilities of the particular browser software, customized to the browsing consumer, targeted to explicit and inferred characteristics of the consumer, and branded to the organization providing access.

Transformational proxies deployed to capture and monetize display real estate are referred to herein as "Web Portholes." The user browses the web as usual, but all transactions pass through the centralized porthole engine acting as a "porthole" to the web.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for allowing a proxy server to deliver unrequested content to users browsing the Internet. In this configuration, the proxy server is termed a "porthole engine."

Delivering the Requested Web Page

In one embodiment, in response to a request from a user for an information document, porthole engine 30 receives the virgin response from the origin server 40, scans the response, and sends a modified response back to a client 10 which "captures" a portion of display real estate, and populates it with new documents, typically containing branding and merchandising campaigns.

Typically, the captured screen real estate may be within the browser's content window or within auxiliary windows. In both cases, the screen real estate is captured by modifying the information documents as they pass through porthole engine 30. Porthole engine 30 supports various mechanisms for capturing display real estate, four of which are described herein. These four mechanisms may used separately or one in conjunction with another.

1. Modifying web page content to encapsulate the original content within a paneled "frame"; the other panels may be used as captured real-estate.
2. Modifying the web page content to reserve space at the top or bottom of the web page as captured real-estate.
3. Modifying the web page content to pop-up auxiliary display windows for use as captured display real-estate.
4. Modifying the web page content to replace existing content (graphics or text) with replacement content.

Because browser clients have different abilities, and because information documents contain various features, some of which may conflict with the screen-real-estate-claiming modifications, porthole engine 30 needs to rewrite information content being aware of the capabilities of the browser, and the extant features in each information document.

Because different users of the solution will have different branding and commercial requirements, porthole engine 30 implements a general and parameterizable page-rewriting system that can apply different techniques for screen real-estate capture and different unrequested content for different consumers.

Frame-Wrapping

In one embodiment, porthole engine 30 implements display real-estate acquisition and population by "wrapping" the target content page with additional frames which can be used for unrequested information. In such an embodiment, in response to a request from a user for a web page, porthole engine 30 does not initially return to the user the requested page, but instead returns a totally different document in the form of frameset scaffolding data. This frameset data identifies various embedded items, including the original requested web page, and indicates how these documents are to be displayed in frames within the content display area of the user's browser. The requested web page is thus displayed in only a portion of the content display area.

Figure 2:
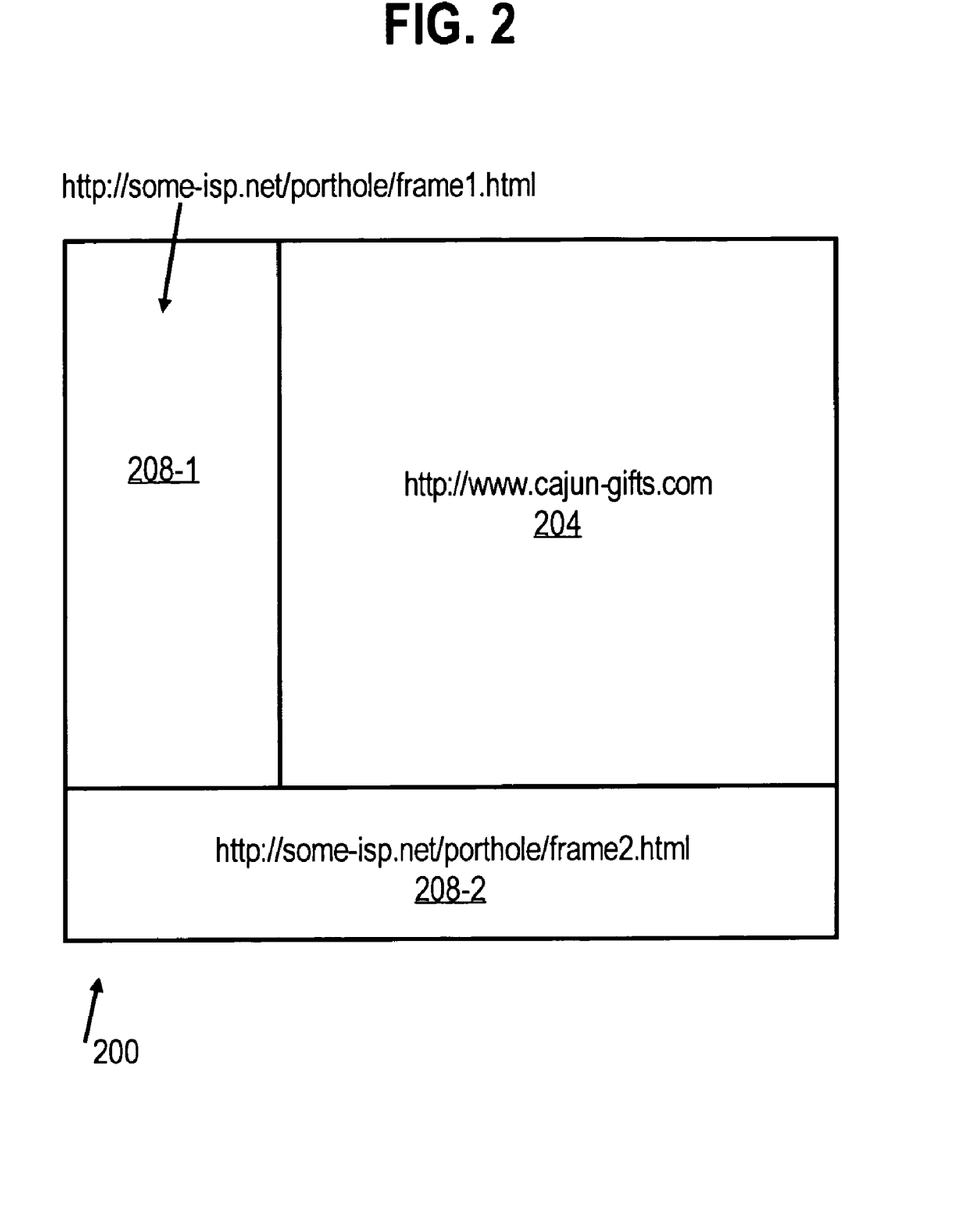
FIG. 2 shows an exemplary content display area of a browser of a client after a user requests a web page.

FIG. 2 shows an exemplary content display area 200 of a browser of a client 10 after a user requests a web page, such as, for example, http://www.cajun-gifts.com/. In response to the request, porthole engine 30 delivers to the browser a web page that includes frame data which, when interpreted by the browser, causes the browser to divide the content display area 200 into three distinct regions: area 204, area 208-1 and area 208-2. The frame data also includes code that instructs the browser how to populate the three areas. In the illustrated example, areas 204, 208-1 and 208-2 are respectively populated by http://www.cajun-gifts.com/, http://some-isp.net/porthole/frame1.html and http://some-isp.net/porthole/frame2.html.

Area 204 displays the content of http://www.cajun-gifts.com/, which was initially requested by the user, and requested a second time as an "embedded item" within the framed web page. Areas 208-1 and 208-2 display the unrequested information. The unrequested information may be any form of content that was not requested by the user, such as advertisements. While the unrequested information is "unrequested" relative to the user, the unrequested data is requested by the browser in response to the browser decoding the frame data.

The unrequested content that is sent to the user is specified in the frame data that is sent to the user, and the frame data is sent by porthole engine 30. Consequently, the controller of porthole engine 30 also controls which unrequested information is sent to the user. Typically, the party that controls porthole engine 30 is the ISP or the corporation running an intranet.

Page Modification

The above section discussed the use of frame-wrapping to acquire and populate screen real estate. In one embodiment, porthole engine 30 also support HTML rewriting to append objects to the header/footer of a document, to replace objects within a document, and to generate pop-up windows.

All these techniques are implemented by porthole engine 30 by modifying the response documents to attach new document components.

Selecting and Targeting Unrequested Information

The proxy owner has available to it information about users, and porthole engine 30 has available to it information about the documents requested by users. Consequently, porthole engine 30 may be configured to select the unrequested content to be sent to users that is tailored to the particular users and/or the particular interests reflected by the content requested by users.

In one embodiment, the unrequested information, or the content of display areas 208, is related to the content of http://www.cajun-gifts.com/. For example, if http://www.cajun-gifts.com/ is about Louisiana culture, then display areas 208 may display information interesting to consumers who appreciate Louisiana culture, including for example, advertisements for Jazz music CDs, Creole cookbooks, Mardi Gras travel packages, etc. In one embodiment, the content of display areas 208 are other web pages, often hosted by the organization running the porthole engine 30, such as, http://some-isp.net/porthole/frame1.html and http://some-isp.net/porthole/frame2.html, etc.

Figure 3:
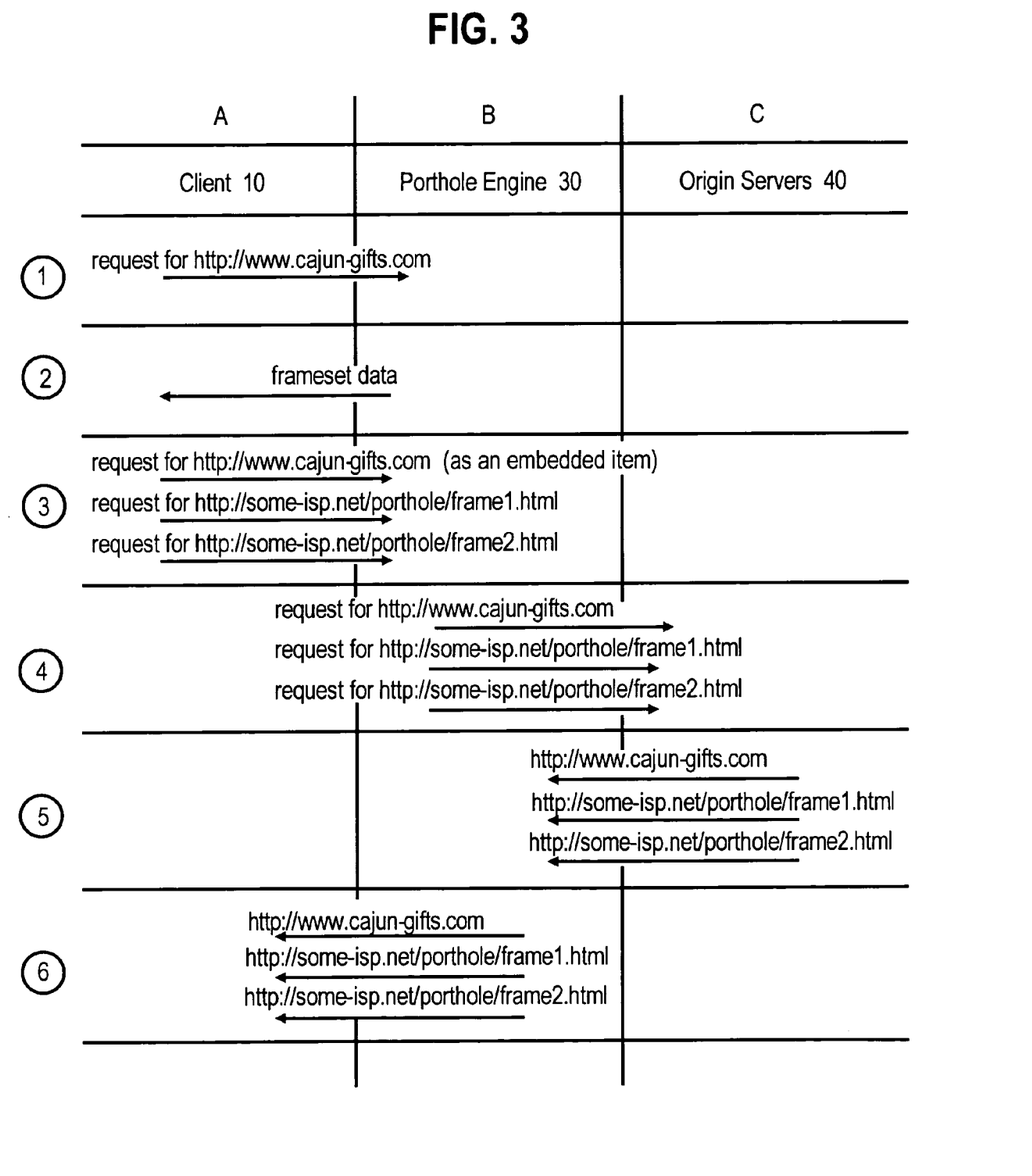
FIG. 3 shows the event sequences in which a web page is requested and delivered with unrequested information, using the frame-wrapping technique.

Event Sequences in Frame-Wrapping: Receiving the Requested Web Page and the Unrequested Information FIG. 3 shows the event sequences for frame-wrapping in which http://www.cajun-gifts.com/ is requested and delivered with the unrequested information provided by http://some-isp.net/porthole/frame1.html and http://some-isp.net/porthole/frame2.html. Columns A, B, and C correspond to a client 10, a porthole engine 30, and various servers 40, respectively.

In step 1, a user, via a web browser, sends an initial request for http://www.cajun-gifts.com/ to porthole engine 30. In response, porthole engine 30 in step 2 sends back to the user frameset data. This frameset data generates an encapsulation of the original target page with panels containing the unrequested information.

The frameset data identifies http://www.cajun-gifts.com/, http://some-isp.net/porthole/frame1.html, and http://some-isp.net/porthole/frame2.html to be displayed in content display area 200. This frameset data also indicates how the documents http://www.cajun-gifts.com/, http://some-isp.net/porthole/frame1.html, and http://some-isp.net/porthole/frame2.html are to be displayed. As shown in FIG. 2, http://www.cajun-gifts.com/, http://some-isp.net/porthole/frame1.html, and http://some-isp.net/porthole/frame2.html are displayed in areas 204, 208-1, and 208-2, respectively.

In step 3, the browser decodes the frameset data and, upon decoding the tags for the embedded items, sends requests for http://www.cajun-gifts.com/, http://some-isp.net/porthole/frame1.html, and http://some-isp.net/porthole/frame2.html to porthole engine 30.

In contrast to the request for http://www.cajun-gifts.com/ issued in step 1, the request for http://www.cajun-gifts.com in step 3 is requesting http://www.cajun-gifts.com/ as an embedded item. As shall be described in greater detail below, techniques are provided which allow porthole engine 30 to distinguish initial requests from requests for porthole-embedded items. The ability to distinguish initial requests from requests for porthole-embedded items is important because, if all requests were treated as initial requests, porthole engine 30 would always respond by sending frame data and the user would never receive the actual content that the user desires.

In step 4, porthole engine 30 forwards requests for http://www.cajun-gifts.com/, http://some-isp.net/porthole/frame1.html, and http://some-isp.net/porthole/frame2.html to appropriate origin servers 40. In step 5, each of the servers 40 that receive corresponding requests for http://www.cajun-gifts.com/, http://some-isp.net/porthole/frame1.html, and http://some-isp.net/porthole/frame2.html, sends the requested information to porthole engine 30, which, in step 6, forwards the information to be displayed within the content display region of the browser from which the initial request was issued.

As the browser receives the information in step 6, the browser determines whether any of the retrieved items include addition embedded items. If there are additional embedded items to be retrieved, then the browser requests and receives the additional embedded items, as in steps 3-6 until there is no more embedded items to be retrieved.

Distinguishing Requests for Porthole-Embedded Items Rewriting Links and URLs

In one embodiment, initial requests are distinguished from requests for embedded items based upon information contained in the URLs associated with the requests. Specifically, in response to an initial request for an item, porthole engine 30 constructs the web page that includes the frame data (the "frame data page"). The frame data page is sent back to the client 10 in response to the initial request. The frame data page specifies the initially-requested item as an embedded item. Typically, the initially-requested item would be identified as an embedded item by including a tag to the initially-requested item within the frame data page, where the tag includes the URL of the initially-requested item.

According to one embodiment, the tag for the initially-requested item that is stored in the frame data web page includes a "fat" URL. A "fat" URL is a URL that includes data in addition to the address of the resource associated with the URL. According to one embodiment, the fat URL that is stored in the frame data page for the initially requested item includes (1) the address of the initially requested data, and (2) an embedded-item flag that indicates to porthole engine 30 that the request is for an embedded item.

When the browser decodes the tag containing the fat URL during the decoding of the frame data page, the browser will send a request to porthole engine 30 to retrieve the initially requested item. That request will contain the embedded-item flag from fat URL. In response to detecting that a request contains the embedded-item flag, porthole engine 30 retrieves the requested data item as normal, without responding with a frame data page.

The initially requested item may itself include links to one or more embedded items. When the browser decodes the initially requested item, the browser will send requests for those embedded items. In response to those requests, the browser should retrieve the requested data items rather than respond with a frame data page. According to one embodiment, porthole engine 30 distinguishes subsequent requests by ensuring that they too contain the embedded-item flag.

To ensure that all requests for embedded items contain the embedded-item flag, porthole engine 30 inspects web pages prior to delivering them to the browser. If a web page contains tags to embedded items, those tags are rewritten to include the embedded-item flag. Consequently, when the tags are decoded by the browser, the browser responds by issuing requests that include the embedded-item flag.

For browsers that support the HTTP Referer tag, HTML rewriting of embedded tags for the purpose of detecting embedded pages may be eliminated. When the browser fetches embedded documents from a page already tagged as being frame-wrapped, the Referer field is set to the URL of the frame-wrapped parent. Porthole engine 30 can recognize these pages as also frame-wrapped, can attach the embedded-item flag, and send a "redirect" message back to the browser asking it to fetch the newly tagged URL. This Referer/redirect technique is an alternative to rewriting the HTML in the porthole engine 30. It provides the same result of tagging URLs as porthole-embedded.

In one embodiment, porthole engines 30 chooses to rewrite the links in embedded framed documents to affect frame behavior. For example, the TARGET attribute of a link controls which frame a new document will be loaded into. Porthole engine 30 chooses to rewrite links, for example, to set the TARGET to be the entire browser contents window. This will cause the full contents window to be redrawn, the porthole frame contents to be refreshed, and the top-level URL display on the browser toolbar to be updated.

For illustration purposes, simplified pseudocode for the essence of frame wrapping is shown here:

```
while (1)
{
    // (1)   proxy read the next HTTP request
    request = http_read(client_socket);
    // (2)   If the browser is requesting a top-level URL, instead of
    //       loading a page from within a porthole, send back a frameset
    //       to grab display real-estate, instead of sending back the page.
    in_porthole = (has_embedded_tag(request.url) || has_embedded_tag(request.referer));
    if (! in_porthole)
    {
        tagged_url = add_embedded_tag(request.url);
        frameset = build_frameset(tagged_url);
        http_msg = http_build_response(frameset);
        http_write(client_socket, http_msg);
    }
    // Otherwise, the URL request originated from within a porthole. There
    // are two possibilities: (3) the requested URL is tagged as being in
    // the porthole (done if HTML rewriting is performed), and (4) the
    // requested URL is not tagged as being in a porthole (happens when the
    // redirect mode is used instead of HTML rewriting.
    // (3)   If the referring parent is tagged as being inside a porthole,
    //       but the requested URL is not tagged. This only happens in
    //       the optional mode where HTML proxy rewriting is not done. In
    //       this case, we tag the URL and send a redirect back to the
    //       client, asking it to fetch the new URL instead.
    else if (has_embedded_tag(request.referer) && (! has_embedded_tag(request.url)))
    {
        tagged_url = add_embedded_tag(request.url);
        http_msg = http_build_redirect(tagged_url);
        http_write(client_socket, http_msg);
    }
    // (4)   The requested URL is tagged as being inside a porthole.
    //       Since the porthole already exists, we want to send back the
    //       real page contents, and NOT wrap it in another frameset.
    else         // case (4)
    {
        url = remove_embedded_tag(request.url);
        server_socket = http_connect(url.server,url.port);
        http_msg = http_build_request(url);
        http_write(server_socket, http_msg);
        response_msg = http_read(server_socket);
        rewrite_html(response_msg);
        http_write(client_socket, response_msg);
    }
}
```

Practical Considerations

In practice, differences in browsers and in page components can cause rewritten pages to not behave correctly on certain revisions of certain vendor's browser software. A practical deployment of web portholes will need to recognize incompatibilities between document constructs and browser capabilities, and act accordingly. In some cases, porthole engine 30 may decide to replace one version of transformation (e.g. frame-wrapping) with another version of transformation (e.g. pop-up window) when such incompatibilities exist of are suspected.

For example, some browsers do not support frames. Others do not support pop-up windows. Other browsers have deficiencies or idiosyncrasies that porthole engines 30 will need to work around.

Similarly, some form of page content may interfere with the porthole engine 30. For example, some HTML pages include client-side active languages such as "Javascript" which attempt to manipulate frames. These constructs may conflict with the porthole engine's effort to perform frame-wrapping. In one embodiment, porthole engine 30 will attempt to detect these conflicts, and either defuse the conflicts by rewriting the HTML, by applying an alternate real-estate capture technique, or by disabling the porthole for conflicting pages.

In some cases, it is difficult to detect all incompatibilities a priori. In one embodiment, the transformational proxy has a list of manual exceptions for servers, clients, and web pages that should be processed in a different way, or left entirely untouched.

Personalization

In one embodiment, porthole engine 30 distinguishes individual client users, and uses the user identification to personalize the captured screen real-estate. The user identity can be used to modify the look and feel of the display, to select among services offered to clients, and to augment the methods used to target advertisements and merchandising offers to the user.

Four techniques for identifying users are used in various embodiments of the invention, and are described as follows:
1. Cookies—porthole engine 30 can attach cookies to the pages the user browses to identify the user. Cookies are client-side state passed from browser to server in HTTP header information, and writable by the porthole engine 30.
2. Radius authentication—when using telephone dial-up connections, the user authenticates with a user name and password before the network connection is established. This authentication is commonly performed and accounted using a protocol called RADIUS. By observing the RADIUS authentication transactions and the resulting network address assigned to a client 10, porthole engine 30 can relate the network address (visible on all client communication) with the underlying username.
3. IP tracking—in environments where users are assigned particular network addresses, and in environments where a network address to user identity database is available, porthole engine 30 can identify the user from its network address.
4. Proxy authentication—porthole engine 30 can perform its own challenge-response authentication, prompting the user for a username and password before providing access through the porthole. This technique is implemented using HTTP proxy authentication machinery which is part of the HTTP standard.

Branding and Vertical Portholes

In one embodiment, porthole engine 30 is parameterizable to yield a variety of different user experiences. A single instance of a porthole engine may simultaneously provide an arbitrary number of distinct visual appearances and functional behaviors. For example, one set of users may be presented with a pop-up advertisement, while another set of users may be presented with a top-of-the-page search engine control panel. This functionality allows the deployment of virtual, vertical porthole engines, each with a different look and feel.

The owner of a porthole engine 30 can offer a variety of distinctively branded, distinctively functional browsing experiences, using the same proxy server, through customization.

Centralized Intermediary Browsing Enhancements

Because porthole engine 30 acts as a centralized intermediary, processing all transaction flows, it offers the ability to provide other value-added services to the browsing experience.

In one embodiment, porthole engine 30 is coupled with databases to provide the ability to fill-in popular form fields (such as credit card ordering fields) automatically. As HTML documents pass through porthole engine 30, named fill-in form fields are seen by porthole engine 30. If an HTML page is registered in porthole engine 30 as "fillable," porthole engine 30 will automatically insert default information into the fields, including, but not restricted to, name, address, and credit card payment information. Porthole engine 30 allows the completion of forms from any server, without requiring any client software.

In one embodiment, a porthole engine 30 is coupled with content filtering technology to restrict access to particular web pages. Such filtering is parameterized by the user's identity.

Hardware Overview

Figure 4:
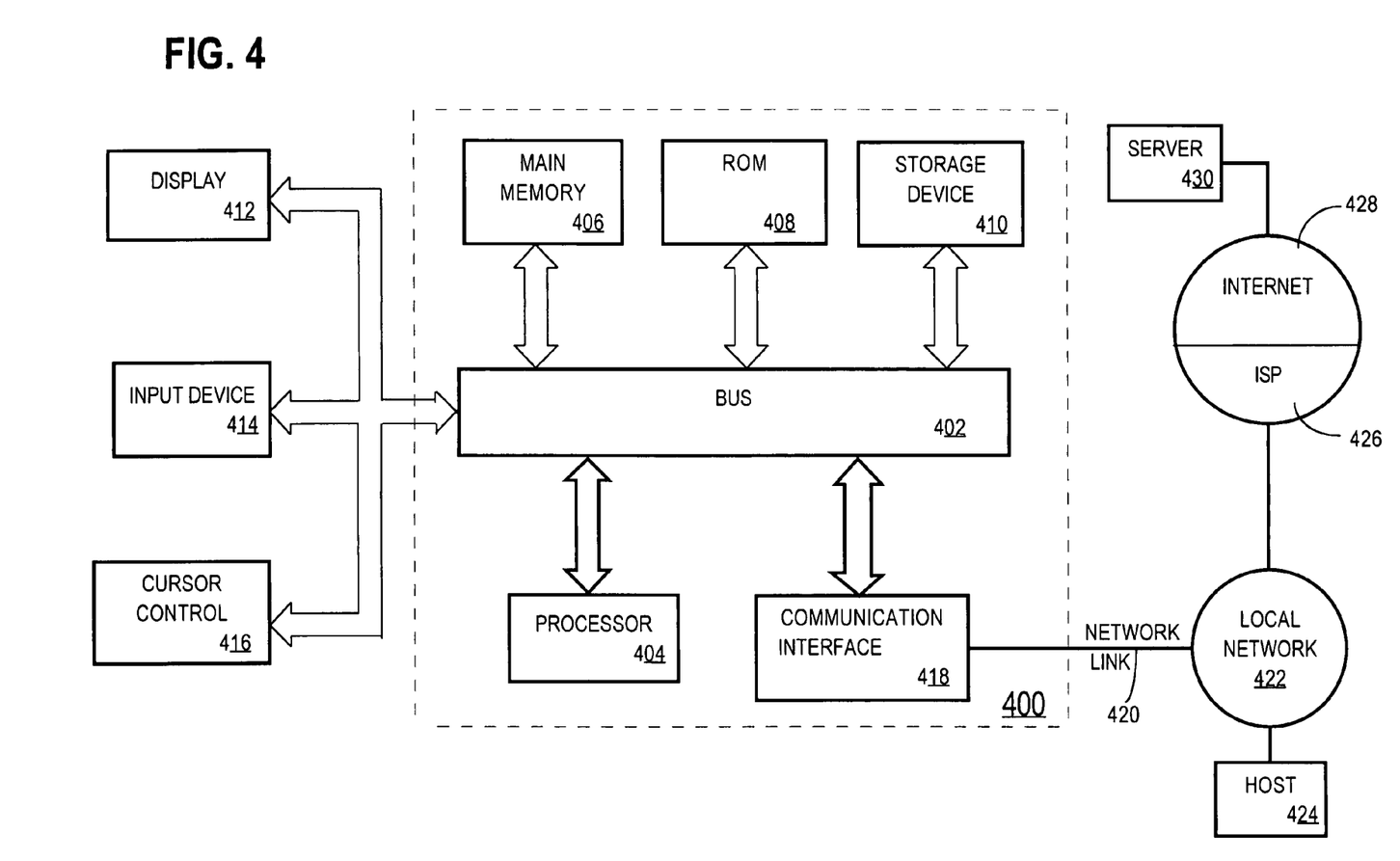
FIG. 4 is a block diagram of a computer upon which an embodiment of the invention may be implemented.

FIG. 4 is a block diagram that illustrates a computer system 400 upon which an embodiment of the invention may be implemented. For example, computer system 400 may implement a client 10, a porthole engine server 30, or an origin server 40, configured to operate as described above. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising the steps of:
receiving, at a porthole engine an initial request for requested content;
wherein the initial request comes from a browser executing on a client;
wherein the initial request includes an address for the requested content, but does not include any embedded-item flag;
wherein said client is connected to a network through said porthole engine;
wherein said requested content resides on an origin server located separate from said porthole engine on said network;
said porthole engine responding to said initial request by sending to said client frame data that defines at least a first frame and at least a second frame, wherein said requested content is to be displayed as an embedded item in said first frame and wherein unrequested content is to be displayed as an embedded item in said second frame;
causing the client to decode the sent frame data, including decoding tags for embedded items;
causing the client to send to the porthole engine a second request for the requested content as an embedded item and the unrequested content as an embedded item;
wherein the second request includes said address for the requested content, and also includes an embedded-item flag that indicates to the porthole engine that the second request is for an embedded item;
in response to detecting that the second request includes the embedded-item flag, responding to the second request by obtaining the requested content from the origin server without sending additional frame data to said client; and causing the client to display said requested content and said unrequested content as embedded items on a single display screen of said client.

2. The method of claim 1 wherein the requested content includes a web page, and wherein the porthole engine causes the web page to be encapsulated within a paneled frame.

3. The method of claim 1 wherein:
said requested content appears on a first portion of a content display region of said browser; and
said unrequested content appears on a second portion of said content display region of said browser.

4. The method of claim 1 wherein said porthole engine determines the format in which to display said requested content and said unrequested content based on one or more factors including at least one of differences in browsers, components of requested web pages, and versions of the browsers.

5. The method of claim 1 further comprising the steps of:
the porthole engine receiving a series of subsequent requests from the browser in response to the browser decoding said frame data, said series of subsequent requests including the second request for said requested content; and
the porthole engine responding to said second request for said requested content by requesting said requested content from said origin server and delivering said requested content to said browser.

6. The method of claim 5 wherein said porthole engine determines that said second request for said requested content is not an initial request for said requested content by using information contained in the URL associated with said initial request and with said second request.

7. The method of claim 1 wherein:
said porthole engine determines that said initial request is not a request for an embedded item by using information contained in the URL associated with said initial request and with said second request; and
the step of sending frame data is performed in response to determining that said initial request is not a request for an embedded item.

8. The method of claim 1 wherein the step of sending frame data to said client includes the step of rewriting a link in an embedded frame document to affect frame behavior.

9. The method of claim 8 wherein the step of rewriting a link includes the step of changing a target attribute of the link.

10. The method of claim 1 wherein:
said porthole engine determines that said initial request is not a request for an embedded item by using information contained in the URL associated with said initial request and with said second request; and
said porthole engine sends data that causes said unrequested content to appear on a portion of said content display region of said browser in response to determining that said initial request is not a request for an embedded item.

11. The method of claim 1 further comprising the step of using information about a particular user to tailor the unrequested content to that particular user.

12. The method of claim 11 wherein the information about the particular user is selected from a group consisting of:
information available to owners of the porthole engine;
information about the requested content; and
a combination of the information available to the owners of the porthole engine and the information about the requested content.

13. The method of claim 1 further comprising the step of identifying the users to personalize the unrequested content.

14. The method of claim 13 wherein the step of identifying the users is performed by a method selected in a group consisting of:
attaching cookies to web pages that are browsed by a particular user;
observing the radius authentication transactions and the resulting network address assigned to the client;
tracking network addresses assigned to the users; and
authenticating the users.

15. The method of claim 1 wherein the requested content includes a web page form, and the unrequested content includes information that automatically fills in one or more fields of said web page form.

16. The method of claim 15 including the step of automatically filling in said one or more fields of said web page form upon determining that a web page being delivered through said porthole engine is associated with said web page form and is registered in the porthole engine as fillable.

17. The method of claim 15 wherein the information that automatically fills in one or more fields of said web page form is provided by a database coupled to the porthole engine.

18. The method of claim 1 wherein the porthole engine restricts access to particular web pages by using content filtering technology based on identities of the users.

19. A computer-readable storage medium storing instructions for allowing a porthole engine to deliver unrequested content to users that access requested content through the porthole engine, the computer-readable medium comprising instructions for performing the steps of:
receiving, at a porthole engine an initial request for requested content;
wherein the initial request comes from a browser executing on a client;
wherein said client is connected to a network through said porthole engine;
wherein said requested content resides on an origin server located separate from said porthole engine on said network;
said porthole engine responding to said initial request by sending to said client frame data that defines at least a first frame and at least a second frame, wherein said requested content is to be displayed as an embedded item in said first frame and wherein unrequested content is to be displayed as an embedded item in said second frame;
causing the client to decode the sent frame data, including decoding tags for embedded items
causing the client to send to the porthole engine a second request for the requested content as an embedded item and the unrequested content as an embedded item;
wherein the second request includes said address for the requested content, and also includes an embedded-item flag that indicates to the porthole engine that the second request is for an embedded item;
in response to detecting that the second request includes the embedded-item flag, responding to the second request by obtaining the requested content from the origin server without sending additional frame data to said client; and
causing the client to display said requested content and said unrequested content as embedded items on a single display screen of said client.

20. The computer-readable storage medium of claim 19 wherein the requested content includes a web page, and wherein the porthole engine causes the web page to be encapsulated within a paneled frame.

21. The computer-readable storage medium of claim 19 wherein:
said requested content appears on a first portion of a content display region of said browser; and
said unrequested content appears on a second portion of said content display region of said browser.

22. The computer-readable storage medium of claim 19 wherein said porthole engine determines the format in which to display said requested content and said unrequested content based on one or more factors including at least one of differences in browsers, components of requested web pages, and versions of the browsers.

23. The computer-readable storage medium of claim 19 further comprising instructions for performing the steps of:
the porthole engine receiving a series of subsequent requests from the browser in response to the browser decoding said frame data, said series of subsequent requests including the second request for said requested content; and
the porthole engine responding to said second request for said requested content by requesting said requested content from said origin server and delivering said requested content to said browser.

24. The computer-readable storage medium of claim 23 wherein said porthole engine determines that said second request for said requested content is not an initial request for said requested content by using information contained in the URL associated with said initial request and with said second request.

25. The computer-readable storage medium of claim 23 wherein:
said porthole engine determines that said initial request is not a request for an embedded item by using information contained in the URL associated with said initial request and with said second request; and
the step of sending frame data is performed in response to determining that said initial request is not a request for an embedded item.

26. The computer-readable storage medium of claim 19 wherein the step of sending frame data to said client includes the step of rewriting a link in an embedded frame document to affect frame behavior.

27. The computer-readable storage medium of claim 26 wherein the step of rewriting a link includes the step of changing a target attribute of the link.

28. The computer-readable storage medium of claim 19 wherein:
said porthole engine determines that said initial request is not a request for an embedded item by using information contained in the URL associated with said initial request and with said second request; and
said porthole engine sends data that causes said unrequested content to appear on a portion of said content display region of said browser in response to determining that said initial request is not a request for an embedded item.

29. The computer-readable storage medium of claim 19 further comprising instructions for performing the step of using information about a particular user to tailor the unrequested content to that particular user.

30. The computer-readable storage medium of claim 29 wherein the information about the particular user is selected from a group consisting of:
information available to owners of the porthole engine;
information about the requested content; and
a combination of the information available to the owners of the porthole engine and the information about the requested content.

31. The computer-readable storage medium of claim 19 further comprising instructions for performing the step of identifying the users to personalize the unrequested content.

32. The computer-readable storage medium of claim 31 wherein the step of identifying the users is performed by a method selected in a group consisting of:
attaching cookies to web pages that are browsed by a particular user;
observing the radius authentication transactions and the resulting network address assigned to the client;
tracking network addresses assigned to the users; and
authenticating the users.

33. The computer-readable storage medium of claim 19 wherein the requested content includes a web page form, and the unrequested content includes information that automatically fills in one or more fields of said web page form.

34. The computer-readable storage medium of claim 33 including instructions for performing the step of automatically filling in said one or more fields of said web page form upon determining that a web page being delivered through said porthole engine is associated with said web page form and is registered in the porthole engine as fillable.

35. The computer-readable storage medium of claim 33 wherein the information that automatically fills in one or more fields of said web page form is provided by a database coupled to the porthole engine.

36. The computer-readable storage medium of claim 19 wherein the porthole engine restricts access to particular web pages by using content filtering technology based on identities of the users.

37. A computer system comprising:
a client that includes memory operatively coupled to a processor;
at least one origin server; and
a porthole engine;
wherein said porthole engine is operatively coupled between the client and the at least one origin server through a network;
wherein said porthole engine is configured to deliver unrequested content to users of said client that access requested content that resides at said at least one origin server through said porthole engine; and
wherein upon a user using said client to initiate an initial request for said requested content through said porthole engine, said porthole engine is configured:
to receive said initial request from a browser executing on the client;
wherein said initial request includes an address for the requested content, but does not include any embedded-item flag;
to respond to said initial request by sending to said client frame data that defines at least a first frame and at least a second frame, wherein said requested content is to be displayed as an embedded item in said first frame and wherein unrequested content is to be displayed as an embedded item in said second frame;
to cause the client to decode the sent frame data, including decoding tags for embedded items;
to cause the client to send to the porthole engine a second request for the requested content as an embedded item and the unrequested content as an embedded item;
wherein the second request includes said address for the requested content, and also includes an embedded-item flag that indicates to the porthole engine that the second request is for an embedded item;

in response to detecting that the second request includes the embedded-item flag, responding to the second request by obtaining the requested content from the origin server without sending additional frame data to said client; and to cause the client to display said requested content and said unrequested content as embedded items on a single display screen of said client.

38. The system of claim 37 wherein the requested content includes a web page, and wherein the porthole engine causes the web page to be encapsulated within a paneled frame.

39. The system of claim 37 wherein:

said requested content appears on a first portion of a content display region of said browser; and said unrequested content appears on a second portion of said content display region of said browser.

40. The system of claim 37 wherein said porthole engine is further configured to determine the format in which to display said requested content and said unrequested content based on one or more factors including at least one of differences in browsers, components of requested web pages, and versions of the browsers.

41. The system of claim 37 wherein the porthole engine is further configured:

to receive a series of subsequent requests from the browser in response to the browser decoding said frame data, said series of subsequent requests including the second request for said requested content; and to respond to said second request for said requested content by requesting said requested content from said at least one origin server and delivering said requested content to said browser.

42. The system of claim 41 wherein said porthole engine is further configured to determine that said second request for said requested content is not an initial request for said requested content by using information contained in the URL associated with said initial request and with said second request.

43. The system of claim 37 wherein:

said porthole engine is further configured to determine that said initial request is not a request for an embedded item by using information contained in the URL associated with said initial request and with said second request; and said porthole engine sending frame data is performed in response to determining that said initial request is not a request for an embedded item.

44. The system of claim 37 wherein said porthole engine is further configured:

to determine that said initial request is not a request for an embedded item by using information contained in the URL associated with said initial request and with said second request; and to send data that causes said unrequested content to appear on a portion of said content display region of said browser in response to determining that said initial request is not a request for an embedded item.

45. The system of claim 37 wherein said porthole engine is further configured to send data to said client to rewrite a link in an embedded frame document to affect frame behavior.

46. The system of claim 45 wherein rewriting a link includes changing a target attribute of the link.

47. The system of claim 37 wherein said porthole engine is further configured to use information about a particular user to tailor the unrequested content to that particular user.

48. The system of claim 47 wherein the information about the particular user is selected from a group consisting of:

information available to owners of the porthole engine;

information about the requested content; and a combination of the information available to the owners of the porthole engine and the information about the requested content.

49. The system of claim 37 wherein said porthole engine is further configured to identify the users to personalize the unrequested content.

50. The system of claim 49 wherein said porthole engine to configured to identify the users by a method selected from a group consisting of:

attaching cookies to web pages that are browsed by a particular user;

observing the radius authentication transactions and the resulting network address assigned to the client;

tracking network addresses assigned to the users; and authenticating the users.

51. The system of claim 37 wherein the requested content includes a web page form, and the unrequested content includes information that automatically fills one or more fields of said web page form.

52. The system of claim 51 wherein the porthole engine is further configured to automatically fill in said one or more fields of said web page form upon determining that a web page being delivered through the porthole engine is associated with said web page form and is registered in the porthole engine as fillable.

53. The system of claim 51 wherein the information that automatically fills in one or more fields of said web page is provided by a database coupled to the porthole engine.

54. The system of claim 37 wherein the porthole engine to further configured to restrict access to particular web pages by using content filtering technology based on identities of the users.

* * * * *